United States Patent
Coburn, IV et al.

(10) Patent No.: US 9,361,371 B2
(45) Date of Patent: Jun. 7, 2016

(54) PLAYLIST UPDATE IN A MEDIA PLAYBACK SYSTEM

(71) Applicant: Sonos, Inc., Santa Barbara, CA (US)

(72) Inventors: Arthur L. Coburn, IV, Lexington, MA (US); Abhishek Kumar, Santa Barbara, CA (US); Andrew J. Schulert, Cambridge, MA (US)

(73) Assignee: SONOS, INC., Santa Barbara, CA (US)

( * ) Notice: Subject to any disclaimer, the term of this patent is extended or adjusted under 35 U.S.C. 154(b) by 167 days.

(21) Appl. No.: 13/864,081

(22) Filed: Apr. 16, 2013

(65) Prior Publication Data
US 2014/0310316 A1    Oct. 16, 2014

(51) Int. Cl.
*G06F 17/30* (2006.01)

(52) U.S. Cl.
CPC ............................ *G06F 17/30772* (2013.01)

(58) Field of Classification Search
CPC .......................... G06F 9/546; G06F 17/30551
USPC ......................................................... 707/799
See application file for complete search history.

(56) References Cited

U.S. PATENT DOCUMENTS

| | | | |
|---|---|---|---|
| 5,406,634 A | 4/1995 | Anderson et al. |
| 5,856,827 A | 1/1999 | Sudo |
| 5,923,902 A | 7/1999 | Inagaki |
| 6,002,862 A | 12/1999 | Takaike |
| 6,181,316 B1 | 1/2001 | Little et al. |
| 6,255,961 B1 | 7/2001 | Van Ryzin et al. |
| 6,256,554 B1 | 7/2001 | DiLorenzo |
| 6,404,811 B1 | 6/2002 | Cvetko et al. |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |

(Continued)

FOREIGN PATENT DOCUMENTS

| | | |
|---|---|---|
| KR | 20090017795 | 2/2009 |
| WO | 0153994 | 7/2001 |

(Continued)

OTHER PUBLICATIONS

Bluetooth. "Specification of the Bluetooth System: The ad hoc SCATTERNET for affordable and highly functional wireless connectivity" Core, Version 1.0 A, Jul. 26, 1999, 1068 pages.

(Continued)

*Primary Examiner* — Rehana Perveen
*Assistant Examiner* — Hicham Skhoun

(57) ABSTRACT

Embodiments are provided for updating a playlist that has been added to a playback queue in response to changes to the playback queue. The playback queue may be associated with a zone of a network media system such that items in the playback queue are to be rendered by the zone. The playlist may include one or more items playable by the zone, and may be stored separately from where the playback queue is maintained. Embodiments are also provided for updating a playback queue in response to modifications to a playlist included in the playback queue. In some cases, a user modifying the playlist or playback queue may be prompted upon making the modifications whether to also apply the modification to the playback queue or playlist, respectively.

20 Claims, 13 Drawing Sheets

(56) References Cited

U.S. PATENT DOCUMENTS

| | | |
|---|---|---|
| 6,778,869 B2 | 8/2004 | Champion |
| 6,826,283 B1 | 11/2004 | Wheeler et al. |
| 6,985,694 B1 | 1/2006 | De Bonet et al. |
| 7,017,118 B1 | 3/2006 | Carroll |
| 7,020,048 B2 | 3/2006 | McComas |
| 7,113,833 B1 | 9/2006 | Brown et al. |
| 7,117,451 B2 | 10/2006 | Sielken |
| 7,130,608 B2 | 10/2006 | Hollström et al. |
| 7,130,616 B2 | 10/2006 | Janik |
| 7,143,939 B2 | 12/2006 | Henzerling |
| 7,178,106 B2 | 2/2007 | Lamkin et al. |
| 7,187,947 B1 | 3/2007 | White et al. |
| 7,236,773 B2 | 6/2007 | Thomas |
| 7,312,785 B2 | 12/2007 | Tsuk et al. |
| 7,358,960 B2 | 4/2008 | Mak |
| 7,483,538 B2 | 1/2009 | McCarty et al. |
| 7,509,181 B2 | 3/2009 | Champion |
| 7,571,014 B1 | 8/2009 | Lambourne et al. |
| 7,643,894 B2 | 1/2010 | Braithwaite et al. |
| 7,657,910 B1 | 2/2010 | McAulay et al. |
| 7,689,304 B2 | 3/2010 | Sasaki |
| 7,725,533 B2 | 5/2010 | Szeto et al. |
| 7,725,551 B2 | 5/2010 | Szeto et al. |
| 7,742,740 B2 | 6/2010 | Goldberg et al. |
| 7,797,446 B2 | 9/2010 | Heller et al. |
| 7,805,682 B1 | 9/2010 | Lambourne |
| 7,827,259 B2 | 11/2010 | Heller et al. |
| 7,853,341 B2 | 12/2010 | McCarty et al. |
| 7,958,441 B2 | 6/2011 | Heller et al. |
| 8,014,423 B2 | 9/2011 | Thaler et al. |
| 8,045,952 B2 | 10/2011 | Qureshey et al. |
| 8,050,652 B2 | 11/2011 | Qureshey et al. |
| 8,055,364 B2 | 11/2011 | Champion |
| 8,072,905 B2 | 12/2011 | Haff et al. |
| 8,074,253 B1 | 12/2011 | Nathan |
| 8,099,313 B2 | 1/2012 | Messer et al. |
| 8,103,009 B2 | 1/2012 | McCarty et al. |
| 8,111,132 B2 | 2/2012 | Allen et al. |
| 8,131,390 B2 | 3/2012 | Braithwaite et al. |
| 8,140,974 B2 | 3/2012 | Hayter et al. |
| 8,148,622 B2 | 4/2012 | Rothkopf et al. |
| 8,156,435 B2 | 4/2012 | Wohlert |
| 8,204,890 B1 | 6/2012 | Gogan |
| 8,214,740 B2 | 7/2012 | Johnson |
| 8,234,395 B2 | 7/2012 | Millington |
| 8,290,603 B1 * | 10/2012 | Lambourne ............ G11B 27/00 381/104 |
| 8,316,154 B2 | 11/2012 | Yoneda |
| 8,364,296 B2 | 1/2013 | Wilhelm |
| 8,407,623 B2 | 3/2013 | Kerr et al. |
| 8,483,853 B1 * | 7/2013 | Lambourne ..................... 700/94 |
| 8,544,046 B2 | 9/2013 | Gran et al. |
| 8,588,949 B2 | 11/2013 | Lambourne et al. |
| 8,799,395 B2 * | 8/2014 | Seidel et al. .................. 709/212 |
| 8,818,538 B1 | 8/2014 | Sakata |
| 8,843,586 B2 | 9/2014 | Pantos et al. |
| 8,954,177 B2 | 2/2015 | Sanders |
| 8,966,394 B2 | 2/2015 | Gates et al. |
| 9,137,602 B2 | 9/2015 | Mayman et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0079038 A1 | 4/2003 | Robbin et al. |
| 2003/0157951 A1 | 8/2003 | Hasty |
| 2003/0198257 A1 | 10/2003 | Sullivan et al. |
| 2003/0210796 A1 | 11/2003 | McCarty et al. |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0215611 A1 | 10/2004 | Jawa et al. |
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0155072 A1 | 7/2005 | Kaczowka et al. |
| 2005/0166157 A1 | 7/2005 | Ollis et al. |
| 2005/0262253 A1 | 11/2005 | Li et al. |
| 2006/0002681 A1 | 1/2006 | Spilo et al. |
| 2006/0041639 A1 | 2/2006 | Lamkin et al. |
| 2006/0107237 A1 | 5/2006 | Kim |
| 2006/0156236 A1 | 7/2006 | Heller et al. |
| 2006/0168340 A1 | 7/2006 | Heller et al. |
| 2006/0195480 A1 | 8/2006 | Spiegelman et al. |
| 2006/0218294 A1 | 9/2006 | Rosenberg |
| 2006/0253782 A1 | 11/2006 | Stark et al. |
| 2006/0263048 A1 | 11/2006 | Sato et al. |
| 2007/0038999 A1 | 2/2007 | Millington et al. |
| 2007/0083897 A1 | 4/2007 | Brownell |
| 2007/0142944 A1 | 6/2007 | Goldberg et al. |
| 2007/0169087 A1 | 7/2007 | Fadell |
| 2007/0266065 A1 | 11/2007 | Rosenberg |
| 2007/0288470 A1 | 12/2007 | Kauniskangas et al. |
| 2008/0005690 A1 | 1/2008 | Van |
| 2008/0016465 A1 | 1/2008 | Foxenland |
| 2008/0059567 A1 | 3/2008 | Williams et al. |
| 2008/0133715 A1 | 6/2008 | Yoneda et al. |
| 2008/0134256 A1 | 6/2008 | DaCosta |
| 2008/0177822 A1 | 7/2008 | Yoneda |
| 2008/0209487 A1 | 8/2008 | Osann et al. |
| 2008/0242222 A1 | 10/2008 | Bryce et al. |
| 2009/0006542 A1 | 1/2009 | Feldman et al. |
| 2009/0171487 A1 | 7/2009 | Wilhelm |
| 2009/0172542 A1 | 7/2009 | Girish et al. |
| 2009/0197524 A1 | 8/2009 | Haff et al. |
| 2009/0228919 A1 * | 9/2009 | Zott et al. .................... 725/34 |
| 2009/0248702 A1 | 10/2009 | Schwartz et al. |
| 2009/0249222 A1 | 10/2009 | Schmidt et al. |
| 2009/0275285 A1 | 11/2009 | Maricevic et al. |
| 2010/0005496 A1 | 1/2010 | Ellis et al. |
| 2010/0042235 A1 | 2/2010 | Basso et al. |
| 2010/0082725 A1 | 4/2010 | Onishi |
| 2010/0082731 A1 | 4/2010 | Haughay et al. |
| 2010/0087214 A1 | 4/2010 | Bournel et al. |
| 2010/0095332 A1 | 4/2010 | Gran et al. |
| 2010/0206815 A1 | 8/2010 | Garusi et al. |
| 2010/0211438 A1 | 8/2010 | Lutnick et al. |
| 2010/0299402 A1 | 11/2010 | Korman et al. |
| 2010/0299639 A1 | 11/2010 | Ramsay et al. |
| 2010/0303244 A1 | 12/2010 | Kim et al. |
| 2010/0306815 A1 | 12/2010 | Emerson et al. |
| 2011/0004330 A1 * | 1/2011 | Rothkopf ............ G11B 27/105 700/94 |
| 2011/0055901 A1 | 3/2011 | Karaoguz et al. |
| 2011/0060998 A1 | 3/2011 | Schwartz et al. |
| 2011/0066943 A1 | 3/2011 | Brillon et al. |
| 2011/0131272 A1 | 6/2011 | Littlejohn et al. |
| 2011/0131518 A1 | 6/2011 | Ohashi |
| 2011/0131520 A1 | 6/2011 | Al-Shaykh et al. |
| 2011/0179455 A1 | 7/2011 | Thompson |
| 2011/0218656 A1 | 9/2011 | Bishop et al. |
| 2011/0225496 A1 | 9/2011 | Jeffe et al. |
| 2011/0252118 A1 | 10/2011 | Pantos et al. |
| 2011/0265003 A1 | 10/2011 | Schubert et al. |
| 2011/0295974 A1 | 12/2011 | Kashef et al. |
| 2012/0029672 A1 | 2/2012 | Hamilton et al. |
| 2012/0050012 A1 | 3/2012 | Alsina et al. |
| 2012/0054808 A1 | 3/2012 | Nijim |
| 2012/0057853 A1 | 3/2012 | Huber et al. |
| 2012/0089910 A1 * | 4/2012 | Cassidy ..................... 715/716 |
| 2012/0113964 A1 | 5/2012 | Petersen et al. |
| 2012/0117026 A1 | 5/2012 | Cassidy |
| 2012/0117193 A1 | 5/2012 | Phillips et al. |
| 2012/0117586 A1 | 5/2012 | McCoy et al. |
| 2012/0147825 A1 | 6/2012 | Hassan et al. |
| 2012/0174204 A1 | 7/2012 | Sturm et al. |
| 2012/0192071 A1 | 7/2012 | Millington |
| 2012/0202485 A1 | 8/2012 | Mirbaha et al. |
| 2012/0227076 A1 | 9/2012 | McCoy et al. |
| 2012/0233067 A1 | 9/2012 | Matthew et al. |

(56) References Cited

U.S. PATENT DOCUMENTS

| | | | |
|---|---|---|---|
| 2012/0284423 A1 | 11/2012 | Weel | |
| 2012/0304233 A1 | 11/2012 | Roberts et al. | |
| 2012/0311094 A1 | 12/2012 | Biderman et al. | |
| 2012/0311618 A1 | 12/2012 | Blaxland | |
| 2013/0014015 A1 | 1/2013 | Lambourne | |
| 2013/0024018 A1 | 1/2013 | Chang et al. | |
| 2013/0047084 A1 | 2/2013 | Sanders et al. | |
| 2013/0054742 A1 | 2/2013 | Tsuji et al. | |
| 2013/0073584 A1* | 3/2013 | Kuper | G06F 17/30038 707/769 |
| 2013/0086003 A1 | 4/2013 | Alsina et al. | |
| 2013/0111529 A1 | 5/2013 | Yao et al. | |
| 2013/0151728 A1 | 6/2013 | Currier | |
| 2013/0165164 A1 | 6/2013 | Rowe | |
| 2013/0167029 A1 | 6/2013 | Friesen et al. | |
| 2013/0173034 A1* | 7/2013 | Reimann | G06F 17/30761 700/94 |
| 2013/0246916 A1* | 9/2013 | Reimann | H04N 21/43615 715/716 |
| 2013/0254207 A1* | 9/2013 | Coburn et al. | 707/740 |
| 2013/0326041 A1* | 12/2013 | Bellet et al. | 709/223 |
| 2013/0346859 A1 | 12/2013 | Bates et al. | |
| 2013/0347117 A1 | 12/2013 | Parks et al. | |
| 2014/0006483 A1 | 1/2014 | Garmark et al. | |
| 2014/0006947 A1 | 1/2014 | Garmark et al. | |
| 2014/0075308 A1* | 3/2014 | Sanders et al. | 715/716 |
| 2014/0080479 A1 | 3/2014 | Vangala et al. | |
| 2014/0096166 A1 | 4/2014 | Gordon et al. | |
| 2014/0108929 A1 | 4/2014 | Garmark et al. | |
| 2014/0115462 A1* | 4/2014 | Reznor et al. | 715/716 |
| 2014/0122737 A1 | 5/2014 | Silberstein et al. | |
| 2014/0123005 A1 | 5/2014 | Forstall et al. | |
| 2014/0140530 A1 | 5/2014 | Gomes-Casseres et al. | |
| 2014/0169569 A1 | 6/2014 | Toivanen et al. | |
| 2014/0195587 A1 | 7/2014 | Sukoff et al. | |
| 2014/0378056 A1 | 12/2014 | Liu | |
| 2015/0026613 A1 | 1/2015 | Kwon et al. | |
| 2015/0074527 A1 | 3/2015 | Sevigny et al. | |
| 2015/0074528 A1 | 3/2015 | Sakalowsky et al. | |
| 2015/0256954 A1 | 9/2015 | Carlsson et al. | |
| 2015/0286360 A1 | 10/2015 | Wachter | |

FOREIGN PATENT DOCUMENTS

| | | |
|---|---|---|
| WO | 2013049346 A1 | 4/2013 |
| WO | 2013101727 | 7/2013 |
| WO | 2014149533 A2 | 9/2014 |

OTHER PUBLICATIONS

Bluetooth. "Specification of the Bluetooth System: Wireless connections made easy" Core, Version 1.0 B, Dec. 1, 1999, 1076 pages.

Dell, Inc. "Dell Digital Audio Receiver: Reference Guide" Jun. 2000, 70 pages.

Dell, Inc. "Start Here" Jun. 2000, 2 pages.

Jo J., et al., "Synchronized One-to-many Media Streaming with Adaptive Playout Control," Proceedings of SPIE, 2002, vol. 4861, pp. 71-82.

Jones, Stephen. "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages.

Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages.

Palm, Inc. "Handbook for the Palm VII Handheld" May 2000, 311 pages.

UPnP; "Universal Plug and Play Device Architecture"; Jun. 8, 2000; version 1.0; Microsoft Corporation; pp. 1-54.

"Presentations at WinHEC 2000" May 2000, 138 pages.

AudioTron Setup Guide, Version 3.0, Voyetra Turtle Beach, Inc., May 2002, 38 pages.

International Search Report for PCT/US2014/034290 mailed Aug. 21, 2014.

Written Opinion of the International Searching Authority for PCT/US2014/034290 mailed Aug. 21, 2014.

Motorola., "Simplefi, Wireless Digital Audio Receiver, Installation and User Guide", Dec. 31, 2001.

PRISMIQ; Inc., "PRISMIQ Media Player User Guide", 2003, 44 pages.

Voyetra; Turtle Beach Inc., "AudioTron Quick Start Guide, Version 1.0", Mar. 2001, 24 pages.

Voyetra; Turtle Beach Inc., "AudioTron Reference Manual, Version 3.0", May 2002, 70 pages.

Voyetra; Turtle Beach Inc., "AudioTron Setup Guide, Version 3.0", May 2002, 38 pages.

"Advisory Action mailed on Oct. 16, 2013, issued in connection with U.S. Appl. No. 13/341,237, filed Dec. 30, 2011, 3 pages".

"Australian Intellectual Property Office, "Patent Examination Report No. 1", issued in connection with Australian patent application No. 2012362573, issued on Jan. 16, 2015, 3 pages".

"Final Office Action mailed on Apr. 22, 2015, issued in connection with U.S. Appl. No. 13/341,237, filed Dec. 30, 2011, 11 pages.".

"Final Office Action mailed on Apr. 14, 2014, issued in connection with U.S. Appl. No. 13/341,237, filed Dec. 30, 2011, 12 pages".

"Final Office Action mailed on Aug. 6, 2013, issued in connection with U.S. Appl. No. 13/341,237, filed Dec. 30, 2011, 14 pages".

"International Preliminary Search Report for Application No. PCT/US2012/071212, mailed Jul. 10, 2014, 8 pages".

"International Search Report for Application No. PCT/US2014/039669, mailed on Sep. 22, 2014, 3 pages".

"International Search Report for PCT/US2014/034292 mailed on Aug. 14, 2014".

"International Search Report for PCT/US2014/034372 mailed Aug. 20, 2014".

"Non-Final Office Action mailed on Mar. 13, 2015, issued in connection with U.S. Appl. No. 13/904,949, filed May 29, 2013, 20 pages".

"Non-Final Office Action mailed on Mar. 2, 2015, issued in connection with U.S. Appl. No. 13/904,896, filed May 29, 2013, 15 pages".

"Non-Final Office Action mailed on Apr. 23, 2015, issued in connection with U.S. Appl. No. 13/904,944, filed May 29, 2013, 12 pages".

"Non-Final Office Action mailed on Dec. 30, 2014, issued in connection with U.S. Appl. No. 14/520,566, filed Oct. 22, 2014, 10 pages".

"Non-Final Office Action mailed on Oct. 8, 2014, issued in connection with U.S. Appl. No. 13/341,237, filed Dec. 30, 2011, 12 pages".

"Non-Final Office Action mailed on Jan. 25, 2013, issued in connection with U.S. Appl. No. 13/341,237, filed Dec. 30, 2011, 9 pages".

"Non-Final Office Action mailed on Nov. 26, 2013, issued in connection with U.S. Appl. No. 13/341,237, filed Dec. 30, 2011, 15 pages".

""Sonos Multi-Room Music System User Guide," Version 090401, Sonos, Inc. Apr. 1, 2009, 256 pages".

""Sonos Wireless Dock Product Guide," Version 100101, Sonos, Inc. Oct. 10, 2001, 196 pages".

""SonosTM Digital Music System User Guide", Version: 070101, Sonos, Inc., Jan. 2007, 179 pages".

""Welcome. You're watching Apple TV." Apple TV 1st Generation Setup Guide, Apr. 8, 2008 Retrieved Oct. 14, 2014, 40 pages".

""Welcome. You're watching Apple TV." Apple TV 2nd Generation Setup Guide, Mar. 10, 2011 Retrieved Oct. 16, 2014, 35 pages".

""Welcome. You're watching Apple TV." Apple TV 3rd Generation Setup Guide, Mar. 16, 2012 Retrieved Oct. 16, 2014, 35 pages".

"Written Opinion of the International Searching Authority for Application No. PCT/US2014/039669, mailed on Sep. 22, 2014, 5 pages".

"Written Opinion of the International Searching Authority for PCT/US2014/034292 mailed on Aug. 14, 2014".

"Written Opinion of the International Searching Authority for PCT/US2014/034372 mailed Aug. 20, 2014".

"Final Office Action mailed on Oct. 23, 2015, issued in connection with U.S. Appl. No. 13/904,944, filed May 29, 2013, 13 pages".

(56) References Cited

OTHER PUBLICATIONS

International Bureau, International Preliminary Report on Patentability, mailed on Oct. 29, 2015, issued in connection with International Application No. PCT/US2014/034290, filed on Apr. 16, 2014, 7 pages.
International Bureau, International Preliminary Report on Patentibility, mailed on Oct. 29, 2015, issued in connection with International Application No. PCT/US2014/034292, filed on Apr. 16, 2014, 6 pages.
International Bureau, International Preliminary Report on Patentability, mailed on Oct. 29, 2015, issued in connection with International Application No. PCT/US2014/034372, filed on Apr. 16, 2014, 8 pages.
Notice of Allowance mailed Oct. 9, 2015, issued in connection with U.S. Appl. No. 13/864,086, filed Apr. 16, 2013, 14 pages.
Supplemental Notice of Allowability mailed on Nov. 4, 2015, issued in connection with U.S. Appl. No. 13/864,086, filed Apr. 16, 2013, 2 pages.
Advisory Action mailed on Dec. 16, 2015, issued in connection with U.S. Appl. No. 13/904,949, filed May 29, 2013, 11 pages.
Advisory Action mailed on Dec. 2, 2015, issued in connection with U.S. Appl. No. 13/904,936, filed May 29, 2013, 4 pages.
Canadian Office Action mailed on Nov. 12, 2015, issued in connection with Canadian Application No. 2,861,790, 3 pages.
Final Office Action mailed on Dec. 7, 2015, issued in connection with U.S. Appl. No. 13/864,075, filed Apr. 16, 2013, 16 pages.
Japanese Office Action mailed on Oct. 20, 2015, issued in connection with Japanese Application No. 2014-550400, 8 pages.
Non-Final Office Action mailed on Nov. 18, 2015, issued in connection with U.S. Appl. No. 13/904,896, filed May 29, 2013, 18 pages.
Non-Final Office Action mailed on Nov. 18, 2015, issued in connection with U.S. Appl. No. 13/904,932, filed May 29, 2013, 12 pages.
Final Office Action mailed on Jan. 20, 2016, issued in connection with U.S. Appl. No. 14/628,952, filed Feb. 23, 2015, 10 pages.
Non-Final Office Action mailed on Feb. 2, 2016, issued in connection with U.S. Appl. No. 13/904,936, filed May 29, 2013, 14 pages.
Non-Final Office Action mailed on Jan. 19, 2016, issued in connection with U.S. Appl. No. 13/341,237, filed Dec. 30, 2011, 10 pages.
Non-Final Office Action mailed on Dec. 28, 2015, issued in connection with U.S. Appl. No. 14/520,566, filed Oct. 22, 2014, 10 pages.
Pre-Interview First Office Action mailed on Dec. 22, 2015, issued in connection with U.S. Appl. No. 14/520,578, filed Oct. 22, 2014, 9 pages.
"Advisory Action mailed on Sep. 17, 2015, issued in connection with U.S. Appl. No. 14/520,566, filed Oct. 22, 2014, 4 pages".
"European Patent Office, "The Extended European Search Report," issued in connection with European patent application No. 12861517.6, Jun. 9, 2015, 11 pages".
"Final Office Action mailed on Sep. 25, 2015, issued in connection with U.S. Appl. No. 13/904,949, filed May 29, 2013, 14 pages".
"Final Office Action mailed on Jun. 23, 2015, issued in connection with U.S. Appl. No. 13/904,896, filed May 29, 2013, 16 pages".
"Final Office Action mailed on Aug. 25, 2015, issued in connection with U.S. Appl. No. 13/864,081, filed Apr. 16, 2013, 15 pages.".
"Final Office Action mailed on Aug. 28, 2015, issued in connection with U.S. Appl. No. 13/904,936, filed May 29, 2013, 10 pages.".
"Final Office Action mailed on Jul. 8, 2015, issued in connection with U.S. Appl. No. 14/520,566, filed Oct. 22, 2014, 8 pages.".
"Non-Final Office Action mailed on Mar. 10, 2015, issued in connection with U.S. Appl. No. 13/864,081, filed Apr. 16, 2013, 13 pages.".
"Non-Final Office Action mailed on Feb. 13, 2015, issued in connection with U.S. Appl. No. 13/904,936, filed May 29, 2013, 10 pages.".
"Non-Final Office Action mailed on Aug. 19, 2015, issued in connection with U.S. Appl. No. 13/864,075, filed Apr. 16, 2013, 18 pages.".
"Non-Final Office Action mailed on Mar. 24, 2015, issued in connection with U.S. Appl. No. 13/864,086, filed Apr. 16, 2013, 14 pages.".
"Non-Final Office Action mailed on May 28, 2015, issued in connection with U.S. Appl. No. 14/628,952, filed Feb. 23, 2015, 9 pages.".

* cited by examiner

PLAYLIST UPDATE IN A MEDIA PLAYBACK SYSTEM

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
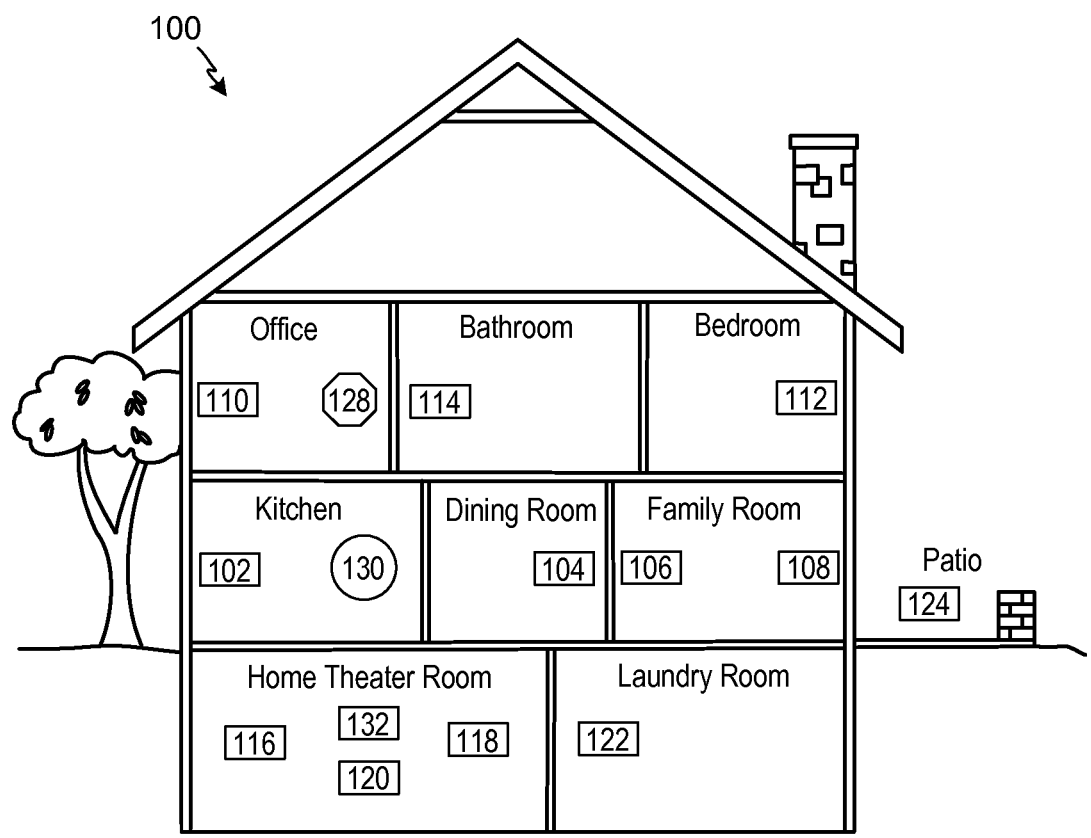
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein may involve updating a playlist that has been added to a playback queue in response to changes to the playback queue. The playback queue may be associated with a zone of a network media system such that items in the playback queue are to be rendered by the zone. The playlist, which may be stored separately from where the playback queue is maintained, may include one or more items playable by the zone. As such, a user may add the playlist to the playback queue, such that the items in the playlist are to be rendered by the zone. If the playback queue was previously empty, then the playback queue may be populated by the items from the playlist. If the playback queue already had items to be rendered by the zone, the playback queue may then include both the previously populated items and the items added from the playlist.

Modifications to the playback queue after the playlist has been added to the playback queue may be made. For instance, the user may choose to add items, remove items, or re-order items in the playback queue. In some cases, the user may wish to apply the same modifications to the stored playlist.

In an example scenario, the user of the network media system may be hosting a dinner party and may have created or retrieved a playlist suitable for the dinner party. The user may subsequently add the playlist to a playback queue of a zone where the dinner party will be taking place. During dinner, guests may be enjoying the music and over lively discussions, may suggest other audio tracks suitable for the occasion. Accordingly, one or more of the suggested audio tracks may be added to the playback queue. Rather than having to separately access the playlist to make the same music track additions (or other suggested modifications), embodiments described herein may cause the playlist to be automatically updated.

In one case, the modifications may be applied without any additional input or action by the user. In another case, upon modifying the playback queue, the user (or whoever is modifying the playback queue) may be prompted to indicate whether to apply the same modifications to the playlist. In either case, once the playlist has been modified according to the modifications to the playback queue, a notification may be provided to indicate to the user that the modifications have been applied to the playlist. In an analogous case, if the user modifies the playlist after the playlist has already been added to the playback queue, the modifications to the playlist may also be automatically applied to the playback queue.

As indicated, the present application involves updating a playlist that has been added to a playback queue in response to changes to the playback queue. In one aspect, a first method is provided. The first method involves receiving by a network media system a playlist from an instruction via a first controller interface. The network media system comprises a zone that includes a playback device and a playback queue, and the playlist identifies one or more media items that are available for playback. The playlist is stored on a second device. The first method further involves adding the playlist to the playback queue associated with the zone. The playback queue is established to contain information identifying one or more items to be played by the zone. The first method also involves receiving an input from a second controller interface to cause the zone to modify the playback queue of the zone, and sending a message to the second device indicating a modification to the playback queue. The modification involves items in the playback queue added from the playlist.

In another aspect, a second method is provided. The second method involves receiving a selection of a playlist on a controller interface. The playlist comprises information identifying one or more playable items, and the playlist is stored on a first device. The second method further involves causing, via the controller interface, the playlist to be sent to a second device of a zone. The one or more items of the playlist is subsequently added to a playback queue of the zone, and the playback queue comprises information identifying one or more items to be played by the zone. The second method also involves receiving an input, via the controller interface, causing a modification to the playlist, and causing a first message to be sent to the second device to modify the playback queue according to the modification to the playlist.

In another aspect, a non-transitory computer readable memory is provided. The non-transitory computer readable memory has stored thereon instructions executable by a computing device to cause the computing device to execute functions. The functions include receiving by a network media system a playlist from an instruction via a first controller interface. The network media system comprises a zone that includes a playback device and a playback queue, and the playlist identifies one or more media items that are available for playback. The playlist is stored on a second device. The functions further include adding the playlist to the playback queue associated with the zone. The playback queue is established to contain information identifying one or more items to be played by the zone. The functions also include receiving an input from a second controller interface to cause the zone to modify the playback queue of the zone, and sending a message to the second device indicating a modification to the playback queue. The modification involves items in the playback queue added from the playlist.

In another aspect, a device is provided. The device includes a processor and computer readable medium having stored thereon instructions executable by the processor to perform function. The functions include receiving a selection of a playlist on a controller interface. The playlist comprises information identifying one or more playable items, and the playlist is stored on a first device. The functions further include causing, via the controller interface, the playlist to be sent to a second device of a zone. The one or more items of the playlist is subsequently added to a playback queue of the zone, and the playback queue comprises information identifying one or more items to be played by the zone. The functions also include receiving an input, via the controller interface, causing a modification to the playlist, and causing a first message to be sent to the second device to modify the playback queue according to the modification to the playlist.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
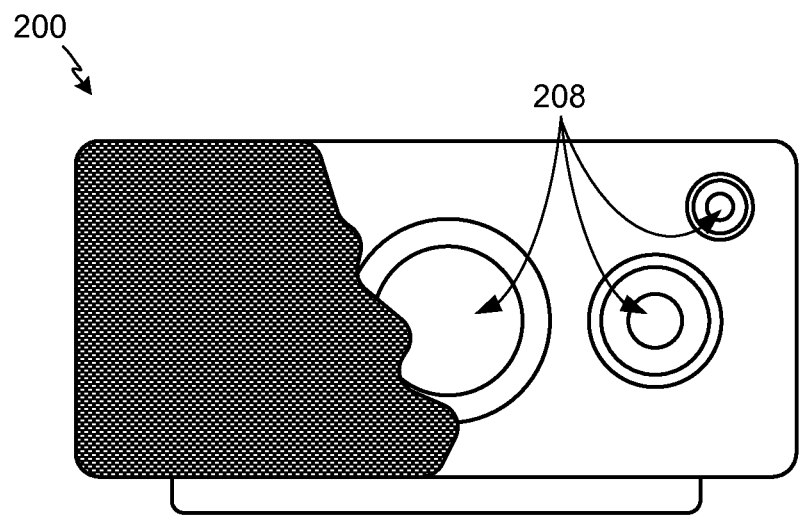
FIG. 2A shows an illustration of an example zone player having a built-in amplifier and transducers.
Figure 2B:
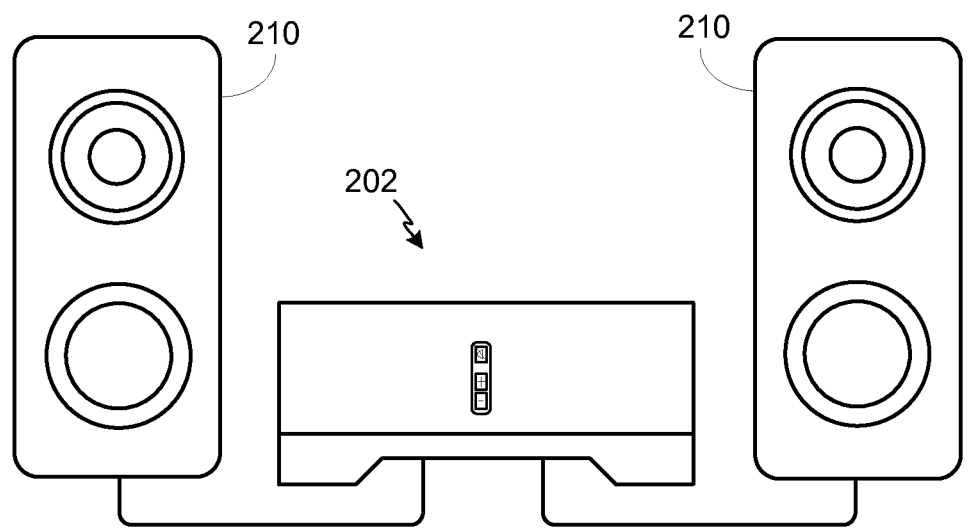
FIG. 2B shows an illustration of an example zone player having a built-in amplifier and connected to external speakers.
Figure 2C:
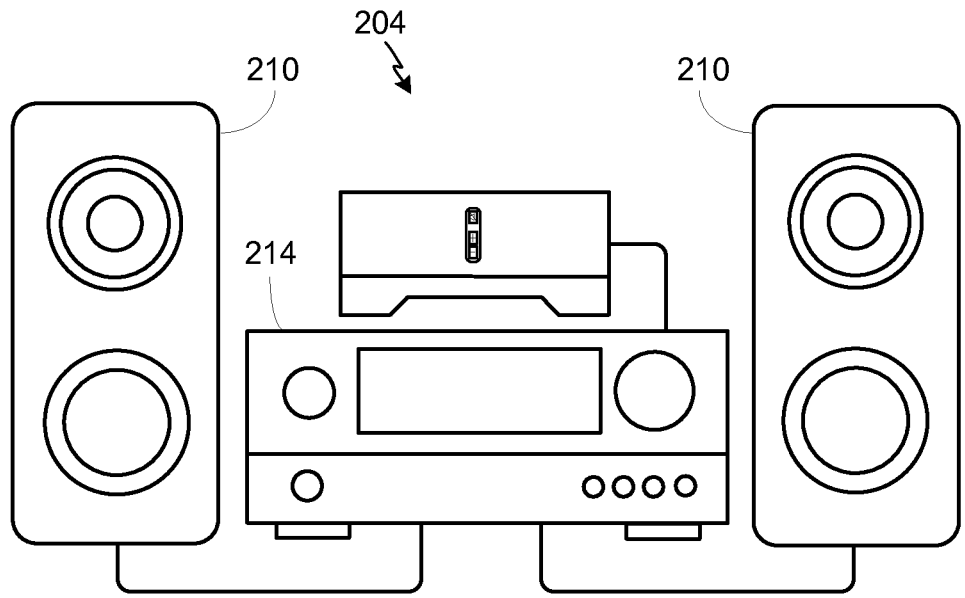
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
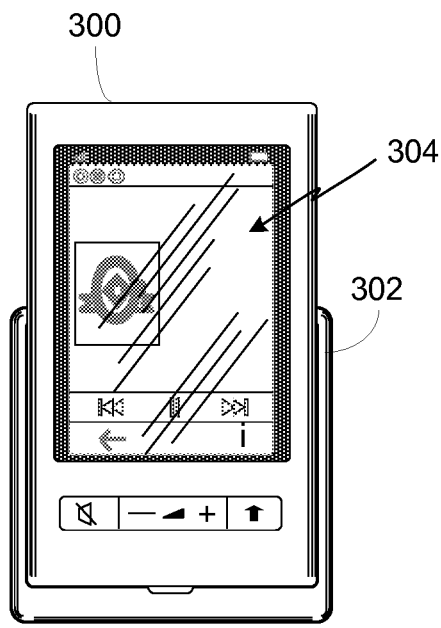
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
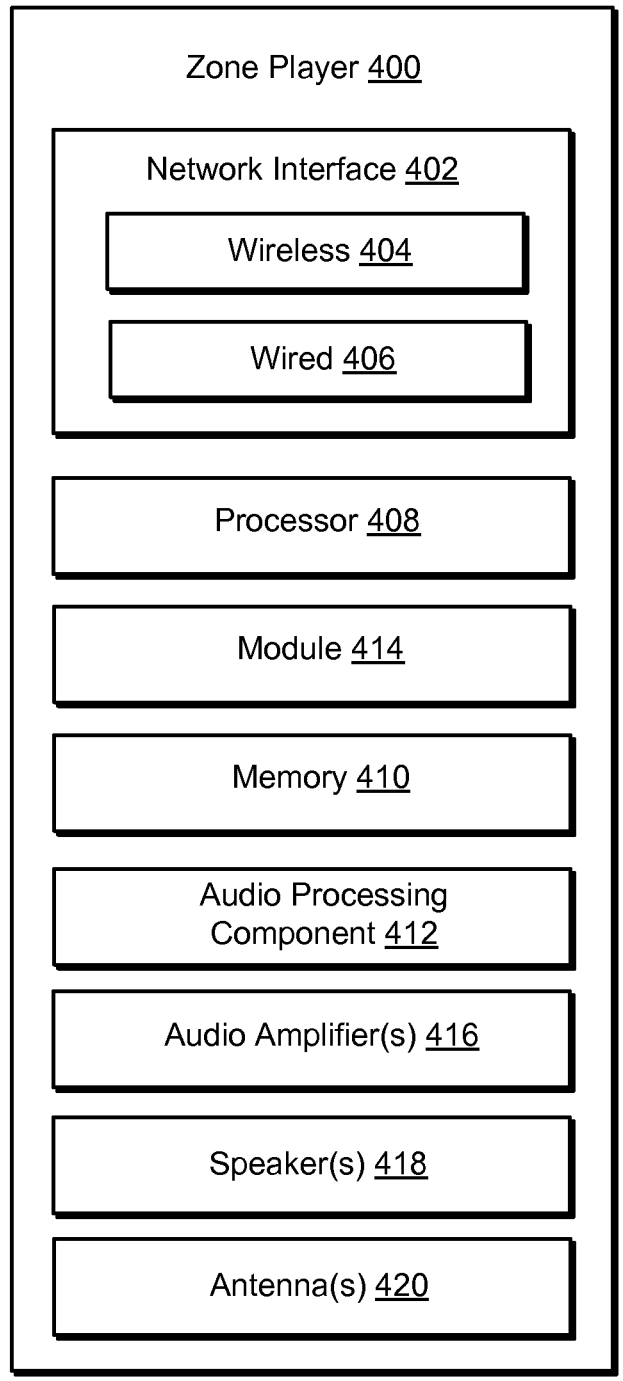
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
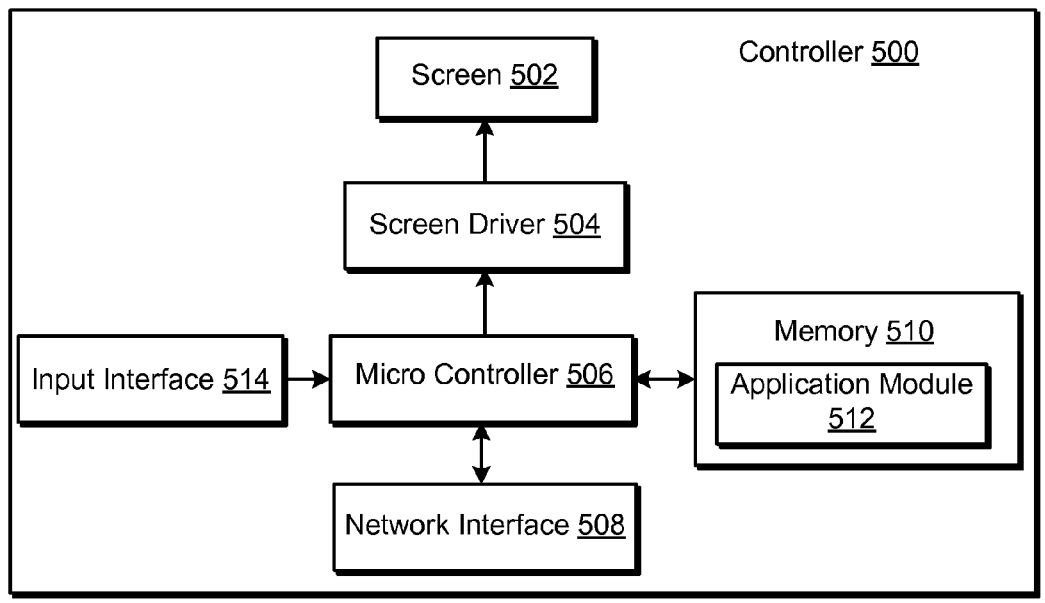
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
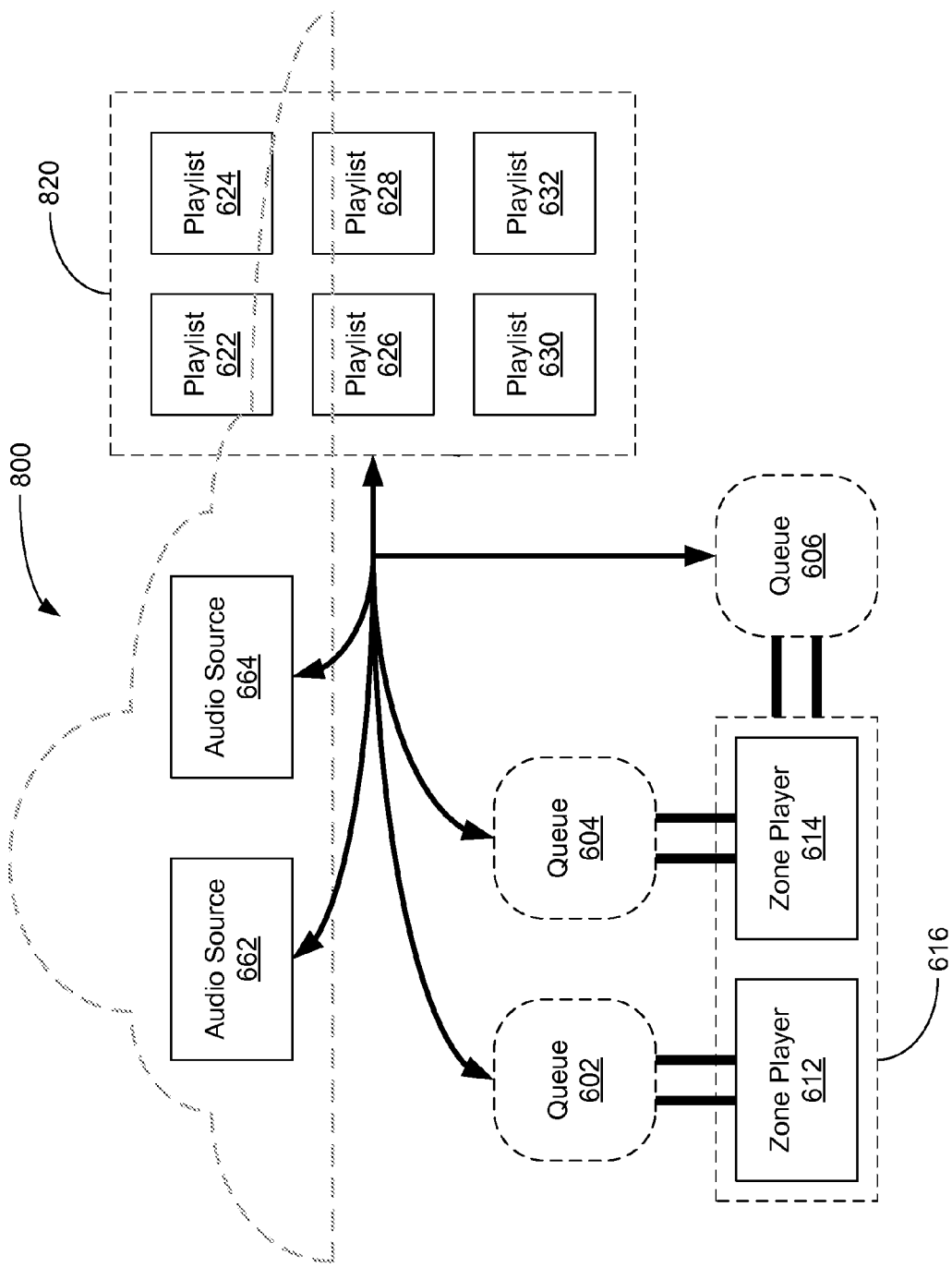
FIG. 6 shows an example playback queue configuration for a network media system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e. URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
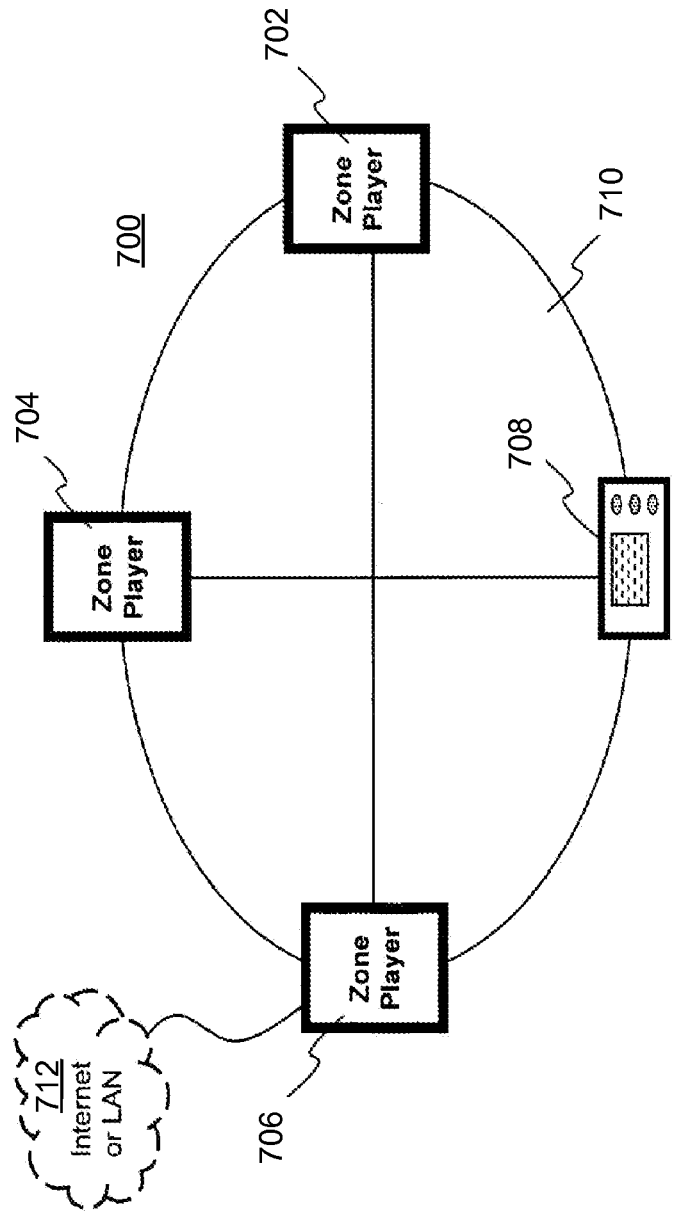
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
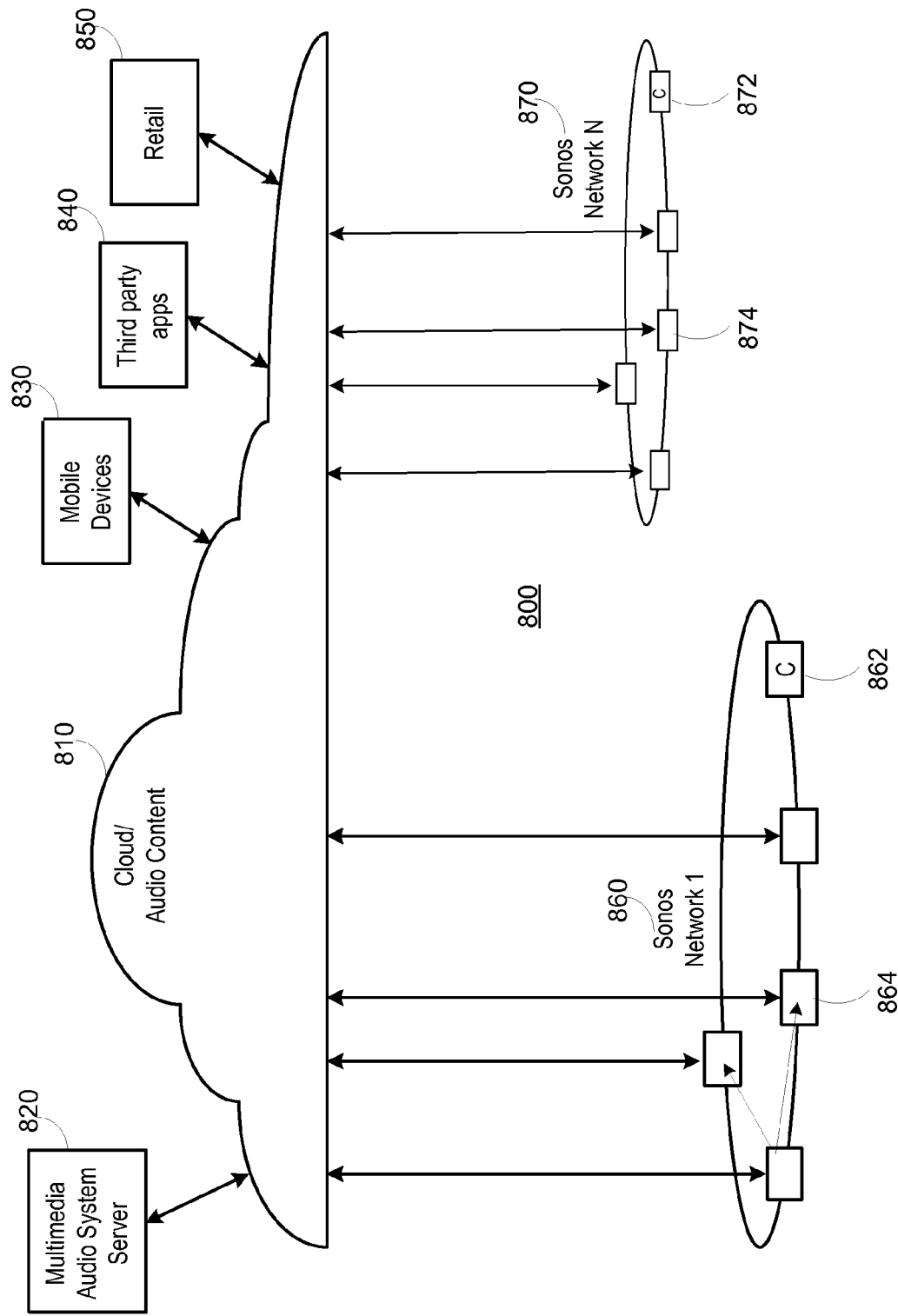
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Updating of Playlists in a Network Media System

Figure 9A:
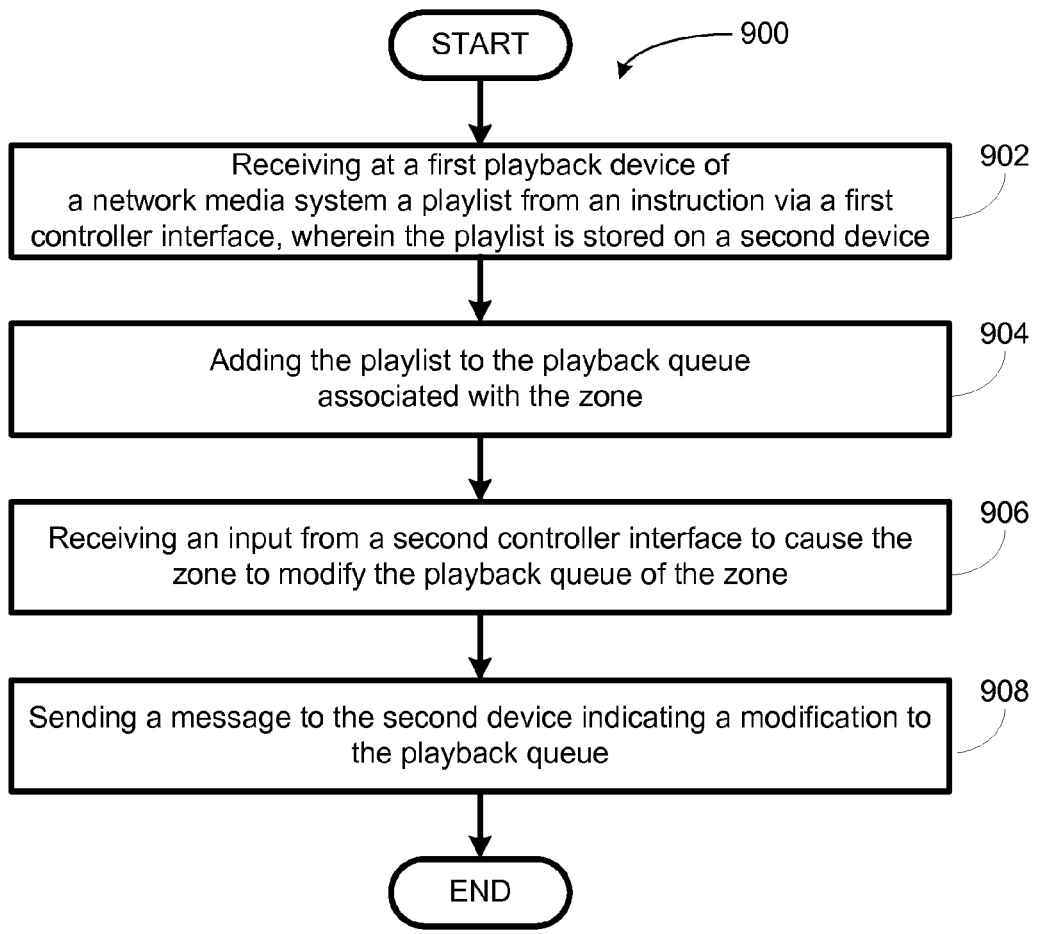
FIG. 9A shows an example flow diagram for updating a playlist in response to a modification to a playback queue including the playlist.

As discussed above, embodiments described herein may provide automatic updating of a playlist that has been added to a playback queue in response to changes to the playback queue. FIG. 9A shows an example flow diagram for updating a playlist in response to a modification to a playback queue including the playlist, in accordance with at least some embodiments described herein. Method 900 shown in FIG. 9A presents an embodiment of a method that could be used in the environments 100, 600, 700 and 800 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-908. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 9A may represent circuitry that is wired to perform the specific logical functions in the process.

At block 902, the method 900 involves receiving at a first playback device of a network media system a playlist from an instruction via a first controller interface. As indicated above, the network media system may include a zone that includes the first playback device and is associated with a playback queue. The playlist may identify one or more media items that are available for playback, and the playlist may be stored on a second device. In one example, the second device may be the first playback device, or if the zone includes other playback devices, one of the other playback devices in the zone. In another example, the second device may be a remote server, such a cloud server accessible by the network media system over the Internet. In a further example, the second device may be a device providing a controller interface, such as the first controller interface for accessing the network media system.

The first controller interface may be an application provided on a device such as a computer, tablet, or smart phone through which the user may access the network media system, such as the controller 300 discussed above in connection to FIG. 3. As such, the first controller interface may be accessed by a user to add media items to the playback queue associated with the zone. In this example, the user may add the playlist to the playback queue by sending an instruction to the first playback device via the first controller interface. If the playlist is stored on the device providing the first controller interface, the playlist may be included in the instruction sent to the first playback device. If the playlist is not stored on the device providing the controller interface, the instructions sent to the first playback device may include a link (such as an URI) to the playlist. As previously discussed, the playlist may be a list of links to media items stored separately from the playlist.

In one case, the instruction including the playlist may further cause the playlist, and accordingly, media items in the playlist to be added to the playback queue associated with the zone of the first playback device. At block 904, the method 900 may involve adding the playlist to the playback queue associated with the zone. As suggested previously, the playback queue may be established for the zone to contain information identifying one or more items to be played by the zone. In one case, the information identifying one or more items to be played by the zone may include links to the one or more items to be played by the zone. As such, adding the playlist to the playback queue associated with the zone may involve adding the information identifying one or more media items in the playlist to the playback queue. For instance, links to the media items in the playlist may be added to the playback queue.

Figure 10A:
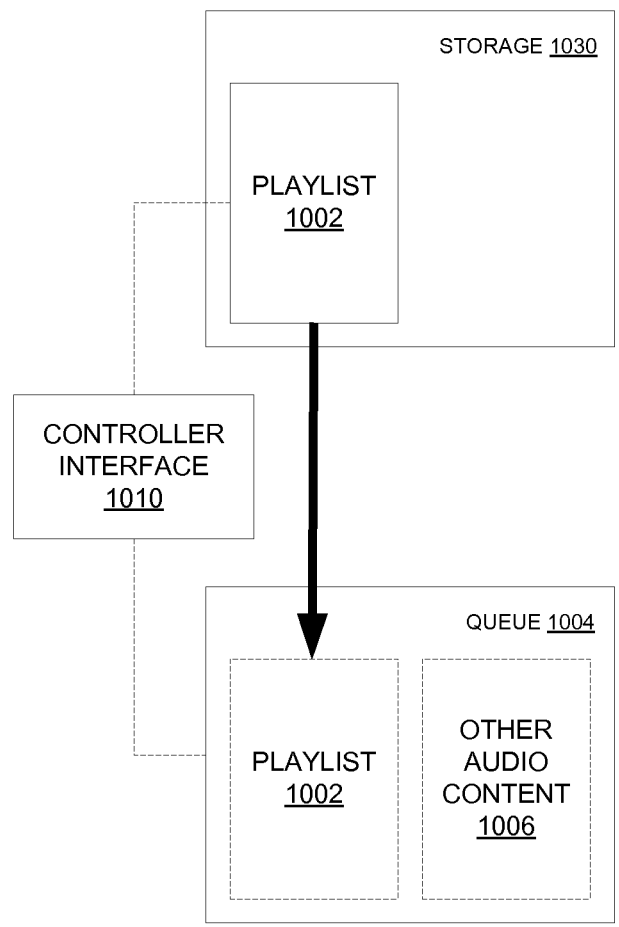
FIG. 10A shows an example block diagram for adding a playlist to a playback queue.

FIG. 10A shows an example block diagram for adding a playlist 1002 to a playback queue 1004. The playback queue 1004 may be associated with the zone of the network media system as discussed herein. As shown in FIG. 10A, a controller interface 1010 in communication with both a storage 1030 where the playlist 1002 is stored, and the playback queue 1004 associated with the zone may be accessed to cause the playlist 1002 to be added to the playback queue 1004. In this case, the storage 1030 may be representative of the second device above. The controller interface 1010 may send an instruction to a playback device in the zone associated with the playback queue 1004 with information identifying the playlist 1002 or one or more media items in the playlist 1002, thereby adding the playlist 1002 to the playback queue 1004.

In one case, if the playback queue 1004 was previously empty, then the playback queue may be populated by the items from the playlist 1002. In another case, if the playback queue already had items to be rendered by the zone, the playback queue 1004 may then include both other audio content items 1006 as shown in FIG. 10A, and the items added from the playlist 1002.

At block 906, the method 900 may involve receiving an input from a second controller interface to cause the zone to modify the playback queue of the zone. In one example, the second controller interface may be the same as the first controller interface, or provided on the same device that provided the first controller interface. This may be the case when the user who added the playlist to the playback queue wishes to make changes to the playback queue. In another example, the second controller interface may be provided on a different device in communication with the network media system. This may be the case when another user wishes to make changes to the playback queue that includes the playlist previously added by the original user. In one case, the second controller interface may be provided by the second device where the playlist is stored.

In one example, the input to cause the zone to modify the playback queue may include inputs to add one or more items to the playback queue, remove one or more items from the playback queue, or re-order one or more items in the playback queue. The input to cause modifications to the playback queue may occur while the zone is rendering media items in the playback queue or while rendering of media items by the zone is paused.

At block 908, the method 900 may involve sending a message to the second device indicating a modification to the playback queue. In one example, the message may be sent in response to a modification to one or more media items in the playback queue that were added to the playback queue when the playlist was previously added to the playback queue. In this example, the message may further include instructions to apply the same modification to the playlist stored on the second device.

In one case, the same modification may be applied to the playlist on the second device automatically. In another case, the second controller interface may prompt the user of the second controller interface to indicate whether the same modification is to be applied to the playlist stored on the second device, and only apply the same modification if an input confirming the application of the modification is received at the second controller interface. In either case, once the playlist has been modified according to the modifications to the playback queue, a notification may be provided to indicate to the user that the modifications have been applied to the playlist.

Figure 10B:
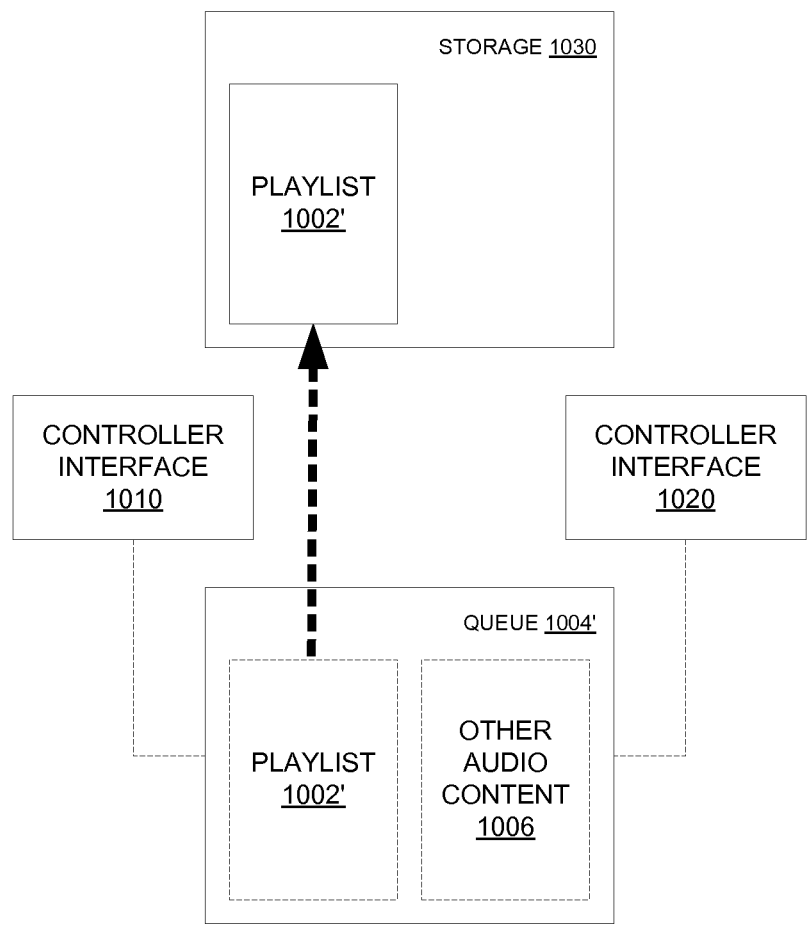
FIG. 10B shows an example block diagram for updating a playlist in response to a modification to a playback queue including the playlist.

FIG. 10B shows an example block diagram for updating the playlist 1002 in response to a modification to the playback queue 1004, which now includes a modified playlist 1002'. As shown, FIG. 10B includes the storage 1030 (which may be the second device), the controller interface 1010, and the other audio content 1006 of FIG. 10A. In FIG. 10B, the modified playback queue 1004' may represent the playback queue 1004 after a modification has been made, and the modified playlist 1002' may represent the playlist 1002 after the modification to the playback queue 1004 has also been applied to the playlist 1002. As shown, the modification to the playback queue 1004 may have been fully applied to the playlist 1002. As such, the other audio content 1006 may remain unchanged. In another case, if only part of the modification to the playback queue 1004 has been applied to the playlist 1002, playback queue 1004' may include playlist 1002' and as well as a modified other audio content 1006' representative of a modification to other audio content 1006 due to the modification to playback queue 1004.

In either case, the modified playlist 1002' may be provided to the storage 1030 to update the playlist 1002 previously stored on the storage 1030. In one case, the message sent to the storage 1030 may include the entire modified playlist 1002'. For instance, the modified playlist 1002' may be provided to the storage 1030 as a new playlist.

In another case, the message sent to the storage 1030 may list only the modification made to the playback queue 1004 that is to be applied to the playlist 1002. For instance, the message may include a change-list that is to be applied to the playlist 1002 to generate the duplicate modified playlist 1002' in the storage 1030. In either case, the modified playlist 1002' may replace the playlist 1002. In one instance, replacing the playlist 1002 may involve deleting the playlist 1002. In another instance, replacing the playlist may involve renaming and saving the playlist 1002 as a different playlist.

As discussed previously, a modification to the playback queue may be made via the controller interface 1010 that originally added the playlist 1002 to the playback queue 1004, or any controller interface provided by a device in communication with the network media system such as controller interface 1020, also shown in FIG. 10B. In such a case, both the controller interface 1010 and the controller interface

1020 may access the playback queue 1004. In this case, the controller interface 1020 may only need to have access to the zone and may not need to have access to the playlist 1002 on storage 1030 to cause the modification to playback queue 1004 and subsequently cause the modification to playlist 1002.

In some cases however, a playlist such as the playlist 1002 of FIG. 10A may be access-protected to prevent unauthorized users and/or controller interfaces from modifying the playlist. In other words, even if a controller interface has access to the zone, the controller interface may not necessarily have access to the playlist, and accordingly, a modification to the playback queue of the zone may not automatically be applied to the playlist. In such cases, whether or not the same modification to the playback queue is applied to the playlist may depend on a credential of the controller interface accessing the zone to modify the playback queue.

In one example, the method 900 may further involve determining that the second controller interface has a credential to access the playlist on the second device. The credential may identify one or more music services the second controller interface has access to, and/or an identifier of the user accessing the second controller interface. As such, determining that the second controller interface has a credential to access the playlist on the second device may involve determining that the second controller interface has access to a music service associated with the playlist stored on the second device. For instance, if the playlist on the second device was created using a particular music service, then the second controller interface may have the credential to access the playlist if the second controller interface also has access to the particular music service.

Determining that the second controller interface has a credential to access the playlist on the second device may further involve determining that the user accessing the second controller has access rights to the playlist on the second device. For instance, the access to the playlist may be restricted to certain users. In one example, the playlist may be restricted to a list of users, such that the second controller interface may access the playlist if the user accessing the second controller interface is one of the users in the list of users. In another example, the playlist may be password-protected, in which case the user accessing the second controller interface may be prompted to enter a password to access the playlist on the second device.

In one case, credentials associated with the second controller interface may be received as part of the input received from the second controller interface at block 906 to cause the zone to modify the playback queue of the zone. In another case, the first playback device may query the second controller interface to provide credentials if credentials were not already received. In a case as discussed above, where the playlist is password-protected, the second controller interface may prompt the user to enter a password, and the password entered by the user may be received as the credential to access the playlist on the second device.

As previously mentioned, the modification made to the playback queue may in some cases, be automatically applied to the playlist. In some other cases, the second controller interface may be configured to prompt the user accessing the second controller to confirm, or indicate whether or not the modification made to the playback queue should be applied to the playlist on the second device. In other words, prior to sending the message to the second device as described in connection to block 908, the method 900 may further involve receiving a second input indicating that the modifications to the playback queue related to items in the playback queue that were added from the playlist should be applied to playlist stored on the second device. Based on the input from the user, the modification to the playback queue may or may not be applied to the playlist stored on the second device.

In a further case, multiple modifications may be made to the playback queue in short succession. In such a case, the first playback device may be configured to send the message to the second device indicating a modification to the playback queue after each modification, or at regular intervals. Other example configurations may also be possible.

Figure 9B:
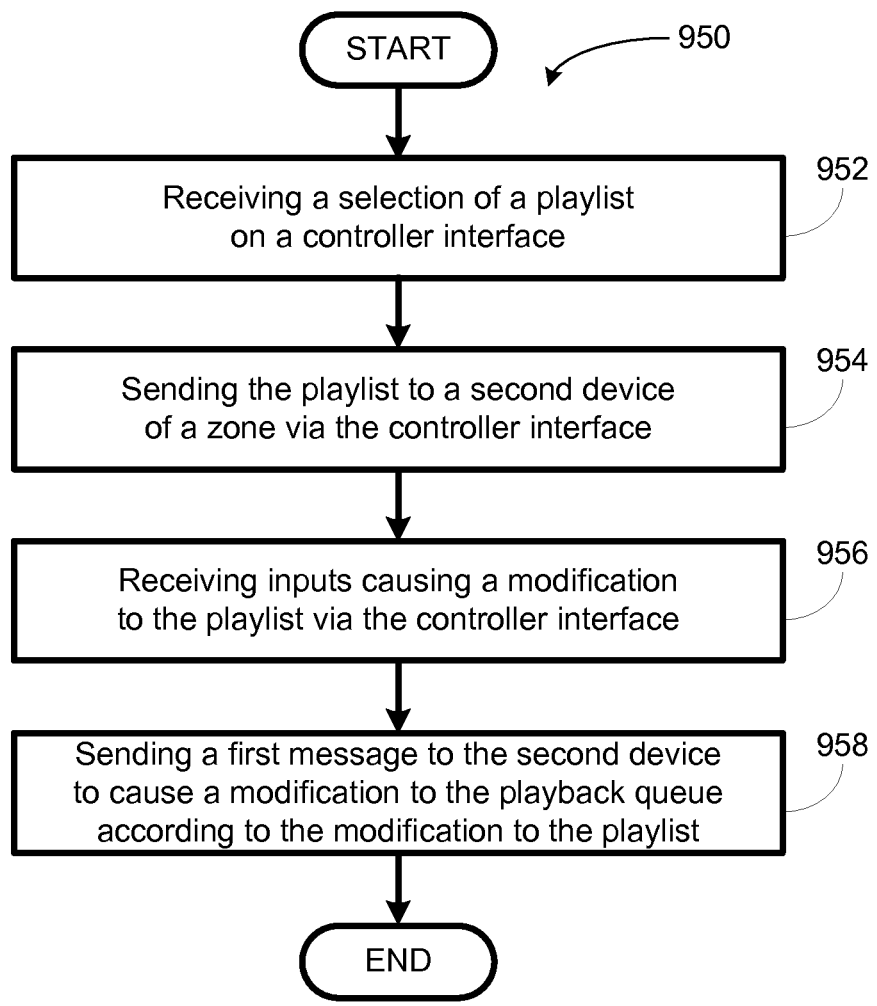
FIG. 9B shows an example flow diagram for updating a playback queue in response to a modification to a playback queue included in the playback queue.

In an analogous case, if the user modifies the playlist after the playlist has already been added to the playback queue, a modification to the playlist may be automatically applied to the playback queue. FIG. 9B shows an example flow diagram for updating a playback queue in response to a modification to a playback queue included in the playback queue, in accordance with at least some embodiments described herein. Method 950 shown in FIG. 9B presents an embodiment of a method that could be used in the environments 100, 600, 700 and 800 with the systems 200, 202, 204, 300, 400, and 500 for example, in communication with one or more devices, such as those illustrated in FIGS. 2-5. Method 950 may include one or more operations, functions, or actions as illustrated by one or more of blocks 952-958. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 952, the method 950 may involve receiving a selection of a playlist on a controller interface. The controller interface may be similar to the first and second controller interfaces described above. The playlist may include information identifying one or more playable items, and may be stored on a first device, similar to the playlist stored on the second device discussed above in connection to method 900.

At block 954, the method 950 may involve sending the playlist to a second device of a zone via the controller interface. The one or more items of the playlist may then be subsequently added to a playback queue of a zone. The second device may be similar to the first playback device described above, and the playback queue of the zone may be similar to playback queue associated with the zone of the network media system discussed above. Accordingly, the playback queue may include information identifying one or more items to be played by the zone.

At block 956, the method 950 may involve receiving inputs causing a modification to the playlist via the controller interface. As opposed to block 906 of method 900, the block 956 involves a modification to the playlist rather than the playback queue. As discussed above in connection to method 900, the playlist may be associated with a music service. As such, a user with access to the playlist on the music service (such as via an application for the music service) may make modifications to the playlist, such as adding items to the playlist, removing items from the playlist, or reordering items in the playlist. Whichever the case, the modification to the playlist may have been made after the playlist has been added to the playback queue of the zone.

At block 958, the method 950 may involve sending a first message to the second device to cause a modification to the playback queue according to the modification to the playlist. In other words, the playback queue may be automatically updated with the modified playlist. Similar to the method 900 discussed above, the controller interface accessed to modify the playlist may prompt the user accessing the controller interface to indicate whether or not the modification to the playlist should be applied to the playback queue to which the original playlist was added. In some cases, the same playlist may have been added to more than one playback queue associated with different zones in different network media systems. In this case, the user may be further prompted to indicate which, if not all playback queues are to be updated with the modified playlist.

Figure 10C:
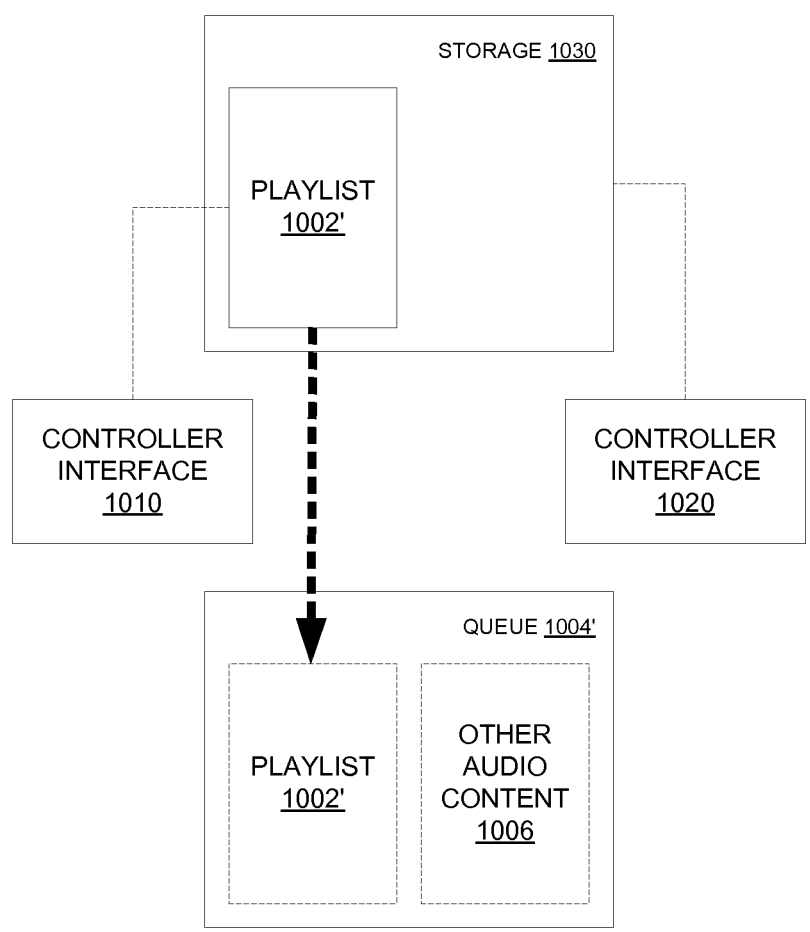
FIG. 10C shows an example block diagram for updating a playback queue in response to a modification to a playlist included in the playback queue.

FIG. 10C shows an example block diagram for updating a playback queue in response to a modification to a playlist included in the playback queue. Similar to that of FIG. 10B, FIG. 10C includes the storage 1030 (the first device, in this embodiment), the controller interface 1010, and the other audio content 1006 of FIG. 10A, as well as the modified playlist 1002', the modified queue 1004', and the controller interface 1020. In contrast to FIG. 10B however, FIG. 10C shows controller 1010 and/or controller 1020 accessing the storage 1030 to modify the playlist 1002 (from FIG. 10A), rather than either controller 1010 or 1020 accessing the playback queue 1004 (also from FIG. 10A) to modify the playback queue 1004 (thereby modifying the playlist 1002 in accordance with method 900 described above). In this case, the modifications to playlist 1002, resulting in modified playlist 1002' may be applied to the playback queue 1004, resulting in modified playback queue 1004'.

In one case, the modified playlist 1002' may replace the playlist 1002 in the playback queue 1004. In other words, the playlist 1002 may be deleted and replaced by the modified playlist 1002'. This may be the case if the playback queue 1004 is not currently being rendered, or if no item in the playback queue 1004 that was added as part of playlist 1002 is currently being rendered. In another case, the individual modification to the playlist 1002 may be applied to the playback queue 1004 so as to reduce interfering with the playback of the playback queue 1004.

In one example, multiple modifications may be made to the playlist in short succession. In one case, the controller interface may be configured to send the message to the second device indicating a modification to the playlist to cause the playback queue on the first device to be updated after each modification. In another case, the controller interface may be configured to send the message to the second device indicating one or more modifications to the playlist, after the modified playlist has been saved on the first device. In this case, the one or more modifications may include all modifications made since the playlist was previously saved (at which point a message may have also been sent to the second device to indicate previous modifications, if any). Other example configurations may also be possible.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves updating a playlist that has been added to a playback queue in response to changes to the playback queue. In one aspect, a first method is provided. The first method involves receiving by a network media system a playlist from an instruction via a first controller interface. The network media system comprises a zone that includes a playback device and a playback queue, and the playlist identifies one or more media items that are available for playback. The playlist is stored on a second device. The first method further involves adding the playlist to the playback queue associated with the zone. The playback queue is established to contain information identifying one or more items to be played by the zone. The first method also involves receiving an input from a second controller interface to cause the zone to modify the playback queue of the zone, and sending a message to the second device indicating a modification to the playback queue. The modification involves items in the playback queue added from the playlist.

In another aspect, a second method is provided. The second method involves receiving a selection of a playlist on a controller interface. The playlist comprises information identifying one or more playable items, and the playlist is stored on a first device. The second method further involves causing, via the controller interface, the playlist to be sent to a second device of a zone. The one or more items of the playlist is subsequently added to a playback queue of the zone, and the playback queue comprises information identifying one or more items to be played by the zone. The second method also involves receiving an input, via the controller interface, causing a modification to the playlist, and causing a first message to be sent to the second device to modify the playback queue according to the modification to the playlist.

In another aspect, a non-transitory computer readable memory is provided. The non-transitory computer readable memory has stored thereon instructions executable by a computing device to cause the computing device to execute functions. The functions include receiving by a network media system a playlist from an instruction via a first controller interface. The network media system comprises a zone that includes a playback device and a playback queue, and the playlist identifies one or more media items that are available for playback. The playlist is stored on a second device. The functions further include adding the playlist to the playback queue associated with the zone. The playback queue is established to contain information identifying one or more items to be played by the zone. The functions also include receiving an input from a second controller interface to cause the zone to modify the playback queue of the zone, and sending a message to the second device indicating a modification to the playback queue. The modification involves items in the playback queue added from the playlist.

In another aspect, a device is provided. The device includes a processor and computer readable medium having stored thereon instructions executable by the processor to perform function. The functions include receiving a selection of a playlist on a controller interface. The playlist comprises information identifying one or more playable items, and the playlist is stored on a first device. The functions further include causing, via the controller interface, the playlist to be sent to a second device of a zone. The one or more items of the playlist is subsequently added to a playback queue of the zone, and the playback queue comprises information identifying one or more items to be played by the zone. The functions also include receiving an input, via the controller interface, causing a modification to the playlist, and causing a first message to be sent to the second device to modify the playback queue according to the modification to the playlist.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A playback device comprising:
    a network interface;
    at least one processor;
    a data storage; and
    a program logic stored in the data storage and executable by the at least one processor to perform operations comprising:
        receiving, via the network interface from a second device, a first instruction to queue a playlist in a playback queue that is associated with a zone, wherein the first instruction identifies a playlist that is stored on a second device, the playlist identifying one or more particular media items that are available for playback by the second device, and wherein the zone includes one or more playback devices;
        based on the first instruction, adding the one or more particular media items identified by the playlist to the playback queue associated with the zone such that the playback queue identifies (i) one or more first media items that correspond to the one or more particular media items identified in the playlist and (ii) one or more second media items that are different from the one or more particular media items identified in the playlist, wherein the one or more first media items and the one or more second media items identified by the playback queue are available for playback by the one or more playback devices of the zone;
        receiving, via the network interface from the second device, a second instruction that instructs the playback device to modify the one or more particular media items identified by the playlist if the playback device modifies the one or more first media items identified by the playback queue;
        receiving a third instruction that causes the playback device to modify the one or more first media items and the one or more second media items of the playback queue associated with the zone such that the one or more first media items identified by the playback queue become inconsistent with the one or more particular media items identified in the playlist that is stored on the second device; and
        sending a message that instructs the second device to modify the playlist such that the one or more particular media items identified in the playlist are consistent with the one or more first media items identified by the playback queue.

2. The playback device of claim 1, wherein modifying the one or more first media items and the one or more second media items of the playback queue comprises one or more of the following: adding at least one media item within the one or more first media items and the one or more second media items, removing at least one of the one or more first media items and the one or more second media items, or re-ordering at least one of the one or more first media items and the one or more second media items.

3. The playback device of claim 1, wherein adding the one or more particular media items identified by the playlist to the playback queue associated with the zone comprises adding information identifying respective locations of the one or more particular media items identified in the playlist to the playback queue.

4. The playback device of claim 1, wherein the playback device received the first instruction from a first controller interface on the second device, wherein the playback device received the third instruction from a second controller interface on the second device, and wherein the operations further comprise:
    prior to sending the message to the second device, determining that the second controller interface has a credential to access the playlist on the second device.

5. The playback device of claim 4, wherein the second instruction received from the second controller interface comprises a credential of the second controller interface.

6. The playback device of claim 5, wherein the credential of the second controller interface identifies a music service identifier associated with respective locations of the one or more corresponding media items identified by the playback queue that are available for playback by the one or more playback devices of the zone.

7. The playback device of claim 5, wherein the credential identifies a user identifier associated with the first controller interface.

8. The playback device of claim 1,
    wherein the second device is a remote server accessible over the Internet;
    wherein receiving the first instruction to queue the playlist in the playback queue comprises receiving the first instruction via the remote server from a first controller interface of a control device, the first controller interface associated with the playlist and configured to control playback of (i) the control device and (ii) the one or more playback devices; and
    wherein receiving the third instruction to modify the one or more first media items and the one or more second media items of the playback queue comprises receiving the third instruction via a second controller interface of the control device, the second controller interface different from the first controller interface and configured to control playback of the one or more playback devices.

9. The playback device of claim 1,
    wherein the second device is a mobile device providing a first controller interface that is associated with the playlist and configured to control playback of (i) the control device and (ii) the one or more playback devices;

wherein receiving the first instruction to queue the playlist in the playback queue comprises receiving the first instruction via the first controller interface of the mobile device; and wherein receiving the third instruction to modify the one or more first media items and the one or more second media items of the playback queue comprises receiving the third instruction via a second controller interface of the mobile device, the second controller interface different from the first controller interface and configured to control playback of the one or more playback devices.

10. The playback device of claim 1, wherein the second device is a first mobile device providing a first controller interface that is associated with the playlist and configured to control playback of (i) the control device and (ii) the one or more playback devices;

wherein receiving the first instruction to queue the playlist in the playback queue comprises receiving the first instruction via the first controller interface of the first mobile device; and wherein receiving the third instruction to modify the one or more first media items and the one or more second media items of the playback queue comprises receiving the third instruction via a second controller interface of a second mobile device, the second controller interface different from the first controller interface and configured to control playback of the one or more playback devices.

11. The playback device of claim 10, wherein sending the message that instructs the second device to modify the playlist such that the one or more particular media items identified in the playlist are consistent with the one or more first media items identified by the playback queue comprises sending a message that instructs the first mobile device to modify the playlist such that the one or more particular media items identified in the playlist are consistent with the one or more first media items identified by the playback queue, wherein the message does not indicate the modification to the one or more second media items of the playback queue caused by the third instruction, and wherein the operations further comprise sending, to the second controller interface of the second mobile device, a message indicating the modification to the one or more first media items and the one or more second media items of the playback queue caused by the third instruction.

12. A non-transitory computer-readable medium having stored therein instructions executable by one or more processors to cause a mobile device to perform operations comprising:

receiving a selection of a particular playlist on a first controller interface, wherein the particular playlist identifies one or more particular media items that are playable by the mobile device, and wherein the particular playlist is stored on the mobile device;

based on the selection of the particular playlist, causing, via the first controller interface, a first instruction to be sent to a playback device, wherein the first instruction causes the playback device to queue the particular playlist in a playback queue that is associated with a zone such that the playback queue identifies (i) one or more first media items that correspond to the one or more particular media items identified in the playlist and (ii) one or more second media items that are different from the one or more particular media items identified in the playlist, and wherein the one or more first media items and the one or more second media items identified by the playback queue are available for playback by one or more playback devices of the zone;

receiving, via the controller interface, input data that requests the playback device to cause a corresponding modification to the one or more particular media items identified by the playlist if the playback device modifies the one or more corresponding media items identified by the playback queue;

based on the input data, sending a second instruction that instructs the playback device to cause a corresponding modification to the one or more particular media items identified by the playlist upon modifying the one or more first media items identified by the playback queue;

receiving, via a second controller interface, input data requesting a modification to the playback queue;

responsively sending, to the playback device, an instruction that causes the playback device to modify the one or more first media items and the one or more second media items of the playback queue associated with the zone such that the one or more first media items identified by the playback queue become inconsistent with the one or more particular media items identified in the playlist that is stored on the mobile device; and receiving a message that causes the mobile device to modify the playlist such that the one or more particular media items identified in the playlist are consistent with the one or more first media items identified by the playback queue.

13. The non-transitory computer readable medium of claim 12, wherein modifying the one or more first media items and the one or more second media items of the playback queue comprises one or more of the following: adding at least one media item within the one or more first media items and the one or more second media items, removing at least one of the one or more first media items and the one or more second media items, or re-ordering at least one of the one or more first media items and the one or more second media items.

14. A non-transitory computer readable medium having stored thereon instruction executable by a playback device to cause the playback device to perform functions comprising:

receiving, via a network interface from a second device, a first instruction to queue a playlist in a playback queue that is associated with a zone, wherein the first instruction identifies a playlist that is stored on a second device, the playlist identifying one or more particular media items that are available for playback by the second device, and wherein the zone includes one or more playback devices;

based on the first instruction, adding the one or more particular media items identified by the playlist to the playback queue associated with the zone such that the playback queue identifies (i) one or more first media items that correspond to the one or more particular media items identified in the playlist and (ii) one or more second media items that are different from the one or more particular media items identified in the playlist, wherein the one or more first media items and the one or more second media items identified by the playback queue are available for playback by the one or more playback devices of the zone;

receiving, via the network interface from the second device, a second instruction that instructs the playback device to modify the one or more particular media items identified by the playlist if the playback device modifies the one or more first media items identified by the playback queue;

receiving a third instruction that causes the playback device to modify the one or more first media items and the one or more second media items of the playback queue associated with the zone such that the one or more first media items identified by the playback queue become inconsistent with the one or more particular media items identified in the playlist that is stored on the second device; and sending a message that instructs the second device to modify the playlist such that the one or more particular media items identified in the playlist are consistent with the one or more first media items identified by the playback queue.

15. The non-transitory computer readable memory of claim 14, wherein modifying the one or more first media items and the one or more second media items of the playback queue comprises one or more of the following: adding at least one media item within the one or more first media items and the one or more second media items, removing at least one of the one or more first media items and the one or more second media items, or re-ordering at least one of the one or more first media items and the one or more second media items.

16. The non-transitory computer readable memory of claim 14, wherein the second device is a remote server accessible over the Internet;

wherein receiving the first instruction to queue the playlist in the playback queue comprises receiving the first instruction via the remote server from a first controller interface of a control device, the first controller interface associated with the playlist and configured to control playback of (i) the control device and (ii) the one or more playback devices; and wherein receiving the third instruction to modify the one or more first media items and the one or more second media items of the playback queue comprises receiving the third instruction via a second controller interface of the control device, the second controller interface different from the first controller interface and configured to control playback of the one or more playback devices.

17. The non-transitory computer readable memory of claim 14, wherein the second device is a mobile device providing a first controller interface that is associated with the playlist and configured to control playback of (i) the control device and (ii) the one or more playback devices;

wherein receiving the first instruction to queue the playlist in the playback queue comprises receiving the first instruction via the first controller interface of the mobile device; and wherein receiving the third instruction to modify the one or more first media items and the one or more second media items of the playback queue comprises receiving the third instruction via a second controller interface of the mobile device, the second controller interface different from the first controller interface and configured to control playback of the one or more playback devices.

18. The non-transitory computer readable memory of claim 14, wherein the second device is a first mobile device providing a first controller interface that is associated with the playlist and configured to control playback of (i) the control device and (ii) the one or more playback devices;

wherein receiving the first instruction to queue the playlist in the playback queue comprises receiving the first instruction via the first controller interface of the mobile device; and wherein receiving the third instruction to modify the one or more first media items and the one or more second media items of the playback queue comprises receiving the third instruction via a second controller interface of a second mobile device, the second controller interface different from the first controller interface and configured to control playback of the one or more playback devices.

19. A first controller interface comprising:

a non-transitory computer readable medium having stored thereon instructions executable by a mobile device to cause the first controller interface to perform functions comprising:

receiving a selection of a particular playlist on the a--first controller interface, wherein the particular playlist identifies one or more particular media items that are playable by the mobile device via the first controller interface, and wherein the particular playlist is stored on the mobile device;

responsive to the selection, causing, via the first controller interface, a first instruction to be sent to a playback device, wherein the first instruction causes the playback device to queue the particular playlist in a playback queue that is associated with a zone such that the playback queue identifies (i) one or more first media items that correspond to the one or more particular media items identified in the playlist and (ii) one or more second media items that are different from the one or more particular media items identified in the playlist, and wherein the one or more first media items and the one or more second media items identified by the playback queue are available for playback by one or more playback devices of the zone;

receiving, via the first controller interface, input data that requests the playback device to modify the one or more particular media items identified by the playlist if the playback device modifies the one or more first media items identified by the playback queue;

based on the input data, sending a second instruction that instructs the playback device to cause a corresponding modification to the one or more particular media items identified by the playlist upon modifying the one or more first media items identified by the playback queue;

receiving an indication of a modification to the playback queue via a second controller interface that caused the one or more first media items identified by the playback queue to become inconsistent with the one or more particular media items identified in the playlist that is stored on the mobile device, wherein the second controller interface is different from the first controller interface; and receiving, via the playback device, a message that instructs the first controller interface of the mobile device to modify the one or more particular media items identified in the playlist to be consistent with the one or more first media items identified by the playback queue.

20. The first controller interface of claim 19, wherein modifying the one or more first media items and the one or more second media items of the playback queue comprises one or more of the following: adding at least one media item within the one or more first media items and the one or more second media items, removing at least one of the one or more first media items and the one or more second media items, or re-ordering at least one of the one or more first media items and the one or more second media items.

* * * * *